June 10, 1924.
J. L. LINGERFELDT
TRANSMISSION
Filed Sept. 11, 1923    2 Sheets-Sheet 1
1,497,240
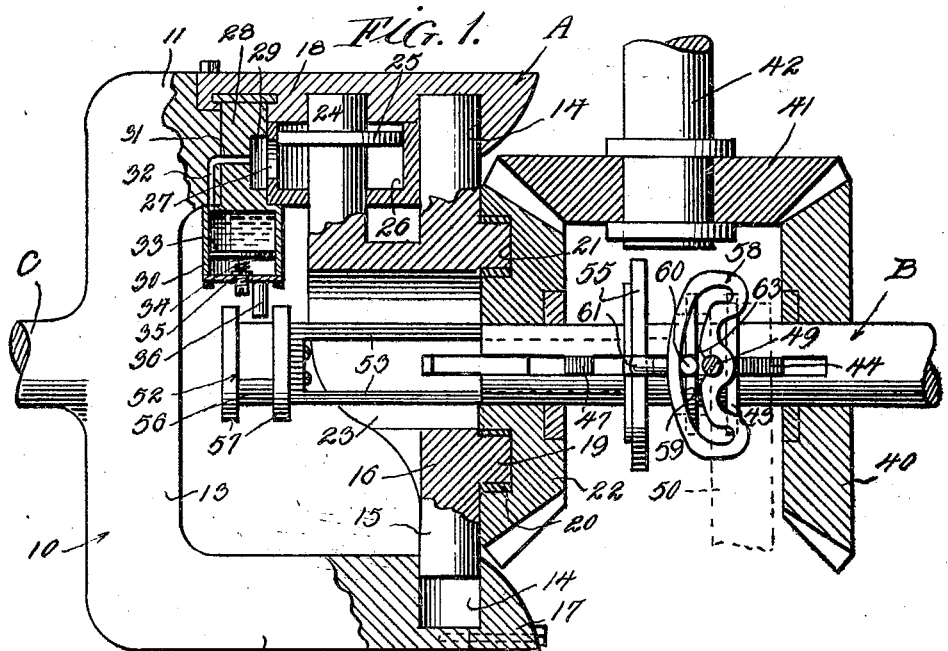
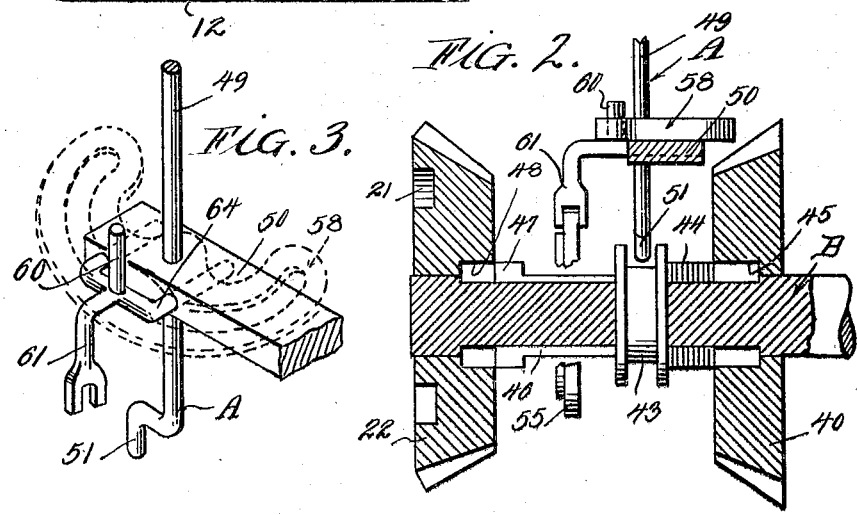
Inventor
JOHN L. LINGERFELDT.
By Richard R. Owen.
Attorney
Witnesses:

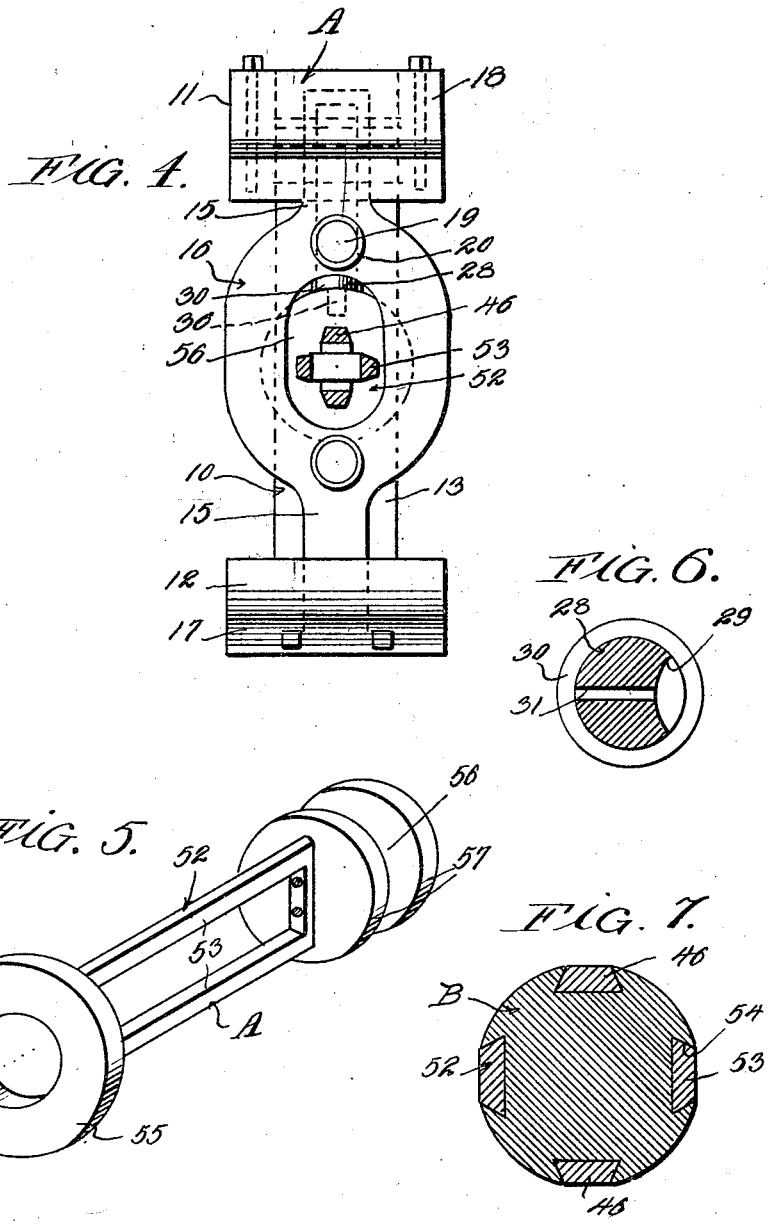

Patented June 10, 1924.

1,497,240

UNITED STATES PATENT OFFICE.

JOHN L. LINGERFELDT, OF ASHEVILLE, NORTH CAROLINA.

TRANSMISSION.

Application filed September 11, 1923. Serial No. 662,137.

*To all whom it may concern:*

Be it known that I, JOHN L. LINGERFELDT, a citizen of the United States, residing at Asheville, in the county of Buncombe and State of North Carolina, have invented certain new and useful Improvements in a Transmission, of which the following is a specification.

This invention appertains to vital improvements in transmissions for motor vehicles and the like and the primary object of the invention is to provide an improved oil or other liquid transmission, in which the necessity of providing a plurality of transmission gears for the desired speeds is eliminated and the consequent operation of the gear shift lever and the difficulties contingent therewith.

Another prime object of the invention is the provision of a hydraulic transmission operatively connected to the propeller or the drive shaft of a motor vehicle and with the engine crank shaft through the medium of a forward and reverse gear, the hydraulic transmission embodying a thrust piston operating in oil or some other non-compressible liquid and novel means for controlling the flow of the oil or other liquid for controlling the speed of the vehicle.

A further prime object of the invention is the provision of a single control lever for operating the forward and reverse gears and for operating the control valve for the oil or other liquid, the control lever being so arranged as to permit the connection of either the reverse or forward gear with the crank shaft prior to the operation of the control valve for setting the vehicle in motion.

A still further object of the invention is to provide a novel hydraulic transmission for motor vehicles of the above character, which will be durable and efficient in use, one that will be simple and easy to manufacture and of a compact nature, and one which can be placed upon the market and incorporated with a motor vehicle at a minimum cost.

With these and other objects in view, the invention consists in the novel construction, arrangement and formation of parts, as will be hereinafter more specifically described, claimed and illustrated in the accompanying drawings, in which drawings:

Figure 1 is a horizontal longitudinal section through the improved transmission.

Figure 2 is a vertical section through the forward end of the transmission illustrating the means for connecting either the forward or reverse gears with the crank shaft and the means for operating the control valve.

Figure 3 is a detail perspective view illustrating the means for supporting the control lever and the slide fork for operating the control member for the control valve.

Figure 4 is an end elevation of the rear portion of the transmission, showing the operating arms of the control member for the control valve and the locking keys for the forward drive gear in section.

Figure 5 is an enlarged detail perspective view of the control member for the control valve.

Figure 6 is a detail cross section through the body portion of the control valve illustrating the arrangement of the ports therein, and Figure 7 is a detail section through the crank shaft illustrating the arrangement of the arms of the control member for the control valve therein and the locking keys for the forward drive gear.

Referring to the drawings in detail, wherein similar reference characters designate corresponding parts throughout the several views, the letter A generally indicates the improved transmission for connecting the crank shaft B of an engine (not shown) with the propeller shaft C of the motor vehicle.

The improved transmission A consists essentially of a yoke-shaped body 10, including the parallel arms 11 and 12 and the connecting body portion 13, which is secured at its axial center in any preferred manner to the propeller shaft C.

The inner faces of the arms 11 and 12 of the yoke-shaped body 10 at their forward terminals are provided with pockets or cylinders 14 for the reception of the reciprocatory supporting pistons or arms 15, which are formed on the substantial elliptical shaped drive plate 16 at diametrically opposite points. The forward terminal of the arm 12 of the yoke 10 supports a detachable end cap 17, while the outer face of the arm 11 supports a detachable body 18 which facilitates the assembling and disconnection of the transmission, when so desired or necessary. The forward face of the elliptical shaped drive plate 16 carries forwardly extending diametrically opposed pins 19 which can be provided with suitable bearing sleeves 20. These pins 19 are fitted in an eccentric groove 21 formed in the rear face of the beveled forward drive gear 22, which is rotatably mounted on the rear end of the crank shaft B.

It can be seen that when the forward drive gear 22 is rotated with the crank shaft B, by means, which will be hereinafter more fully described, that the plate 16 will be reciprocated back and forth in the supporting arms 11 and 12.

The axial center of the plate 16 supports a rearwardly extending hub 23 which in turn carries a radially extending piston rod 24 carrying the piston head 25. The piston head 25 is carried by the piston rod 24 at a point intermediate its ends. The piston rod 24 and piston 25 is mounted within a suitable chamber or cylinder 26 carried by the arm 11 and one side of this chamber is provided with a relatively large outlet port 27. It can be seen that when the plate 16 is reciprocated back and forth by the gear 22 that the piston 25 will slide back and forth across the outlet port 27.

The arm 11 also supports a rotatable valve 28 which is provided, in one face thereof, with a relatively large notch 29, which forms a port or way for communicating with the outlet port 27. The outer end of this valve 28 carries an enlarged hollow head 30 for supporting an excess supply of oil or other liquid being used in the transmission. The head 30 is connected with the notch 29 through the medium of suitable ports 31 and 32 so that oil can be supplied to the chamber or cylinder 26, should any oil leak therefrom.

The chamber or cylinder 26 is at all times filled with oil and it can be seen that when the port or notch 29 is in alignment with the outlet port 27, that the piston 25 will be permitted to reciprocate freely within the said chamber or cylinder 26 thereby allowing free movement of the plate 16 in relation to the yoke 10 and the gear 22. However, when the valve 28 is turned so that the notch 29 will be out of alignment with the port the flow of oil around the piston 25 will be prevented, which will lock the plate 16 and the yoke 10 against relative movement and thus bring about the rotation of the plate 16 and the yoke 10 with the gear 22. It is also to be noticed that by turning the valve 28 that the size of the port 27 can be regulated, so as to get the desired speed. Thus any speed at all can be obtained without the use of any gears. A supply of oil is carried in the head 30, so that in case of any leakage in the cylinder or chamber 26, the same will be replenished and the head 30 carries a follower plate 33 for normally forcing oil into the chamber or cylinder 26. This follower plate 33 is slidably mounted on a suitable axially disposed pin 34 around which is coiled an expansion spring 35 one end of which bears against the end plate of the head 30 and against the follower plate 33. An eccentrically disposed operating pin 36 is carried by the head 30 of the valve 28 for turning the same, as will be hereinafter more fully apparent as the description proceeds.

Mounted upon the crank shaft B for free rotation and facing the forward drive gear 22 is a reverse bevel gear 40 and the gears 40, and 22 are operatively connected together by an idle bevel gear 41, which is rotatably mounted upon a suitable stub shaft 42, which can be supported by any preferred part of the motor vehicle. It is preferred to provide a housing for the transmission and the stub shaft 42 can be supported by said housing if so desired.

In order to bring about the locking of either one of the gears 40 or 22 to the crank shaft, as is desired, according to whether the vehicle is going to be driven forward or backward, a sliding collar 43 is feathered onto the crank shaft B. This collar 43 is provided at its forward face with a pair of forwardly extending keys 44 slidably mounted in suitable grooves formed in the crank shaft B and these keys are adapted to engage in suitable recesses or pockets 45 formed in the rear face of the gear 40. The rear face of the collar 43 supports a pair of rearwardly extending keys 46, which are mounted in suitable longitudinal grooves formed in the crank shaft B. The rear ends of the keys 46 carry heads 47 for engaging in suitable recesses or pockets 48 formed in the forward face of the gear 22. Now it is obvious that by sliding the collar 43 either forwardly or rearwardly, that either the gear 40 can be secured to the shaft B or the gear 22 secured to the shaft B. This collar 43 is slid back and forth by means of a control lever 49, which can terminate at any preferred point adjacent to the driver's seat and steering wheel of the vehicle and this control rod or lever can be rotated in any preferred way. As shown the control rod or lever 49 is rotatably carried by a suitable supporting bracket 50 which can be connected to the casing of the transmission (not shown). The extreme lower end of the control rod or lever 49 is provided with a crank 51 for engaging between the flanges formed on the collar 43.

The control rod or lever 49 also actuates the control member 52 for the control valve.

The control member 52 includes a pair of spaced parallel arms 53, which are slidably mounted in a pair of longitudinally extending grooves 54 formed in the crank shaft B and these grooves are arranged at quarters in relation to the grooves for receiving the keys 46. The arms 53 have their outer surfaces flush with the crank shaft B, so as to permit the free rotation of the drive forward gear 22 around the same and the shaft. The inner ends of the arms 52 have attached thereto the operating ring 55, which is disposed adjacent to the slide collar 43. The arms 53 have secured to their rear terminals the operating collar 56 having the flanges 57 formed on the terminals thereof, between which engage the eccentric pin 36 carried by the head 30 of the valve 28.

In order to bring about the operation of the control member 52 by the control rod or lever 49, the control rod or lever 49 carries the operating eccentric plate 58, which is secured at its central portion to the control rod or lever 49. This eccentric plate 58 is arranged in a horizontal plane and is provided with an eccentric slot 59. This eccentric slot 59 is so formed, as to slidably receive and actuate an upstanding pin 60 formed on the operating fork 61, which engages the ring 55. By referring to Figure 1 of the drawings, it can be seen that the central portion of the eccentric slot 59 is enlarged at its central portion as at 62 and that the terminals of the slot gradually increase in curvature, so as to impart movement to the pin 60, when the eccentric plate is rotated by the control lever or rod 49. By this construction, when the control lever 49 is first rotated the collar 43 will be actuated in advance of the pin 60 and as the control lever is further rotated the pin 60 will be operated so as to slide the control member 52. This allows for keying of either one of the gears 22 or 40 to the crank shaft B prior to the operation of the valve 28. The operating fork 61 carries a pair of supporting arms 64, which are slidably mounted within the supporting bracket 50.

In use of the improved transmission, when it is desired to operate the vehicle forwardly, the control lever or rod 49 is turned in a counter-clockwise direction, when viewing the transmission in Figure 1, which will throw the operating crank 51 formed on the lower end of the rod or lever 49 in engagement with the rear flange formed on the collar 43, which will slide the heads 47 formed on the keys 46 in the pockets 48 formed in the gear 22, thus locking the shaft and the gear 22 together. Thus the gear 22 will now rotate with the shaft B and consequently impart a reciprocatory movement to the plate 16, thus reciprocating the piston 25 in the chamber or cylinder 26. The oil or other liquid in the chamber or cylinder 26 will flow back and forth on each side of the piston 25 in the cylinder and thus no movement will be imparted to the yoke 10 and the propeller shaft C. Upon further movement of the control rod or lever 49 in the same direction, the control member 52 will be slid rearwardly and the forward flange 57 on the collar 56 will engage the eccentric pin 36 thus rotating the valve 28 gradually closing the port 27. As the port 27 is gradually closed, the movement of the piston 25 will be retarded thus gradually locking the member 16 with the gear 22 and with the yoke 10 thus turning the propeller shaft C. Now it is obvious that the speed at which the propeller shaft C is driven can be effectively controlled by regulating the size of the port 27 and when the control member 52 is slid back to its extreme position, the port 27 will be entirely closed, which will prevent further movement of the oil in the cylinder or chamber 26, thus preventing reciprocation of the piston 25 thus firmly locking the yoke 10, the gear 22 and the plate 16 together, and thus causing a direct drive between the crank shaft B and the propeller shaft C, and the vehicle will be in its highest speed.

Now when it is desired to drive the vehicle rearwardly, the control shaft or lever 49 is rotated in a clockwise direction, which will throw the crank 51 into engagement with the forward flange of the collar 43, thus gradually moving the keys 44 in engagement with the reverse gear 40 locking the same to the crank shaft. The rotation of the gear 40 with the crank shaft B will turn the idler 41 and then the gear 22, which will be rotated in a reverse direction than when driven direct by the crank shaft B. The rotation of the gear 22 will again reciprocate the plate 16 and the piston 25 in the cylinder or chamber 26. Upon further movement of the control rod or lever in the same direction will slide the control member 52 rearwardly and again operate the valve 28 for controlling the speed of the vehicle and the locking of the yoke 10, the plate 16 and the gear 22 together.

From the foregoing description, it can be seen that I have provided an exceptionally simple and compact transmission, operating on the hydraulic principle, which will entirely eliminate the use of transmission gears and the shifting of a shift gear lever.

Changes in details may be made without departing from the spirit or the scope of this invention.

What I claim as new is:

1. In a transmission, the combination with a drive shaft, a driven shaft, a pair of drive gears rotatably mounted upon the drive shaft, an idle gear operatively connecting the drive gears together, means for locking either one of the drive gears to the drive shaft, a yoke, means connecting the yoke with the driven shaft, a reciprocating plate, means for reciprocating the plate from one of said drive gears, means operatively connecting the reciprocating plate with the yoke, a piston carried by the plate, a cylinder having oil therein arranged to receive the piston, and means for controlling the flow of oil around the piston.

2. In a transmission mechanism, the combination, a drive shaft, a driven shaft, a pair of independent drive gears rotatably mounted upon the crank shaft, an idle gear connecting the drive gears together, means for locking either one of the drive gears to the drive shaft, a reciprocating plate operated from one of said drive gears, means operatively connecting the reciprocating plate with the driven shaft including a pump having a piston and a cylinder, and means operated by the means for locking the drive gears to the drive shaft for controlling the flow of liquid in the cylinder around the piston, as and for the purpose specified.

3. In a transmission, the combination, a drive shaft, a driven shaft, a pair of independent drive gears rotatably mounted upon the drive shaft, an idle gear connecting the drive gears together, a reciprocating plate operated by one of said drive gears, means carried by the driven shaft for receiving said reciprocating plate, a control member for locking either one of the drive gears to the drive shaft, and means operated from said control means for locking the reciprocating plate with the means carried by the driven shaft for receiving the same, as and for the purpose specified.

4. In a transmission mechanism, the combination, a drive shaft, a driven shaft, a pair of drive gears rotatably mounted upon the drive shaft, an idle gear operatively connecting the drive gears together, a reciprocating plate, operated from one of said drive gears, means for receiving the reciprocating plate carried by the driven shaft, means for locking either one of the drive gears to the drive shaft, and hydraulic means for locking and controlling the movement of the reciprocating plate with the means carried by the driven shaft for receiving said member, as and for the purpose specified.

5. In a liquid transmission, a drive and a driven shaft, a pair of drive gears rotatably mounted upon the drive shaft, means for locking either one of the drive gears on the drive shaft for rotation therewith, a head carried by the driven shaft, a reciprocating plate carried by the head operated from one of said drive gears, means including a pump for controlling the operation of the reciprocating plate in relation to the head, said pump including a piston carried by the plate and a cylinder for receiving the piston carried by the head, a port formed in the cylinder for permitting the flow of liquid around the piston from one end of the cylinder to the other during the reciprocation of said plate, a valve for controlling the size of the port, and a control member for actuating said valve.

6. In a fluid transmission, the combination, a drive shaft, a driven shaft, a pair of drive gears rotatably mounted upon the drive shaft, an idle gear operatively connecting the drive gears together, means for locking either one of the drive gears to the drive shaft for rotation therewith, a reciprocating plate, a head carried by the driven shaft for receiving said plate, means for operating the plate from one of said drive gears, means for controlling the movement of said plate in relation to said head including a fluid pump, the pump consisting of a piston head carried by the plate and a cylinder carried by the head for receiving said piston head, a port formed in the cylinder for controlling the flow of liquid from one end of the cylinder to the other around said piston head, a rotary valve for controlling the size of the port for controlling the movement of the plate in relation to the head, a control member for the valve slidably carried by the crank shaft, the control member including a collar and an operating plate, an eccentric pin operated by the collar carried by the rotary valve, a control rod, means operated by the control rod for locking either one of the gears to the drive shaft, and means operated from the control rod for actuating said control member, as and for the purpose specified.

7. In a hydraulic transmission, a drive shaft, a driven shaft, a pair of drive gears rotatably mounted upon the drive shaft, an idle gear operatively connecting the drive gears together, a head formed on the driven shaft, a reciprocating plate carried by the head operated from one of said drive gears, means for locking and controlling the movement of the plate in relation to the head including a fluid pump, the pump comprising a piston head carried by the plate and a cylinder carried by said head, a port in the cylinder for permitting the flow of liquid from one end of the cylinder to the other around said piston head, a rotary valve carried by the head for controlling the active size of the port, an eccentric pin formed on said valve, a slidable control member carried by the crank shaft including a collar for engaging and operating said pin, and an actuating plate, a control rod, an eccentric plate carried by the control rod, means for actuating said sliding control member from the eccentric plate, and means actuated by the control rod for locking either one of said gears to the drive shaft.

8. In a hydraulic transmission, the combination, a drive shaft, a driven shaft, a pair of drive gears rotatably mounted upon the drive shaft, an idle gear operatively connecting the drive gears together, a U-shaped yoke carried by the driven shaft, a reciprocatory plate carried by the yoke, outwardly extending diametrically opposed pins formed on the plate, one of the drive gears having an eccentric slot formed therein for receiving said pins, a piston head carried by the plate, a cylinder formed in the yoke for receiving said piston head, the cylinder having a port therein for permitting the flow of liquid from one end of the cylinder to the other around the piston head, a rotary valve for controlling the active size of the port, an eccentric operating pin formed on the valve, a control slide member carried by the drive shaft including a collar for receiving and actuating said pin, and an actuating plate, a control rod, a collar slidably mounted upon the crank shaft, keys carried by the collar, a crank formed on the lower end of the control rod for engaging the collar for sliding the same on the shaft for moving the keys in engagement with either one of the drive gears for locking either one of the same on the drive shaft, an eccentric plate having a cam slot formed therein, an operating fork, means slidably supporting the operating fork, a pin formed on the fork disposed in the cam slot, the fork engaging the plate carried by the control member, whereby upon movement of the control rod, the control member will be actuated, the cam slot being larger at its central portion than at its ends to permit movement of the collar carrying the keys prior to the actuation of the pin carried by the operated fork.

9. In a hydraulic transmission, the combination, a drive shaft, a driven shaft, a pair of drive gears rotatably mounted upon the drive shaft, an idle gear operatively connecting the drive gears together, a yoke carried by the driven shaft, a reciprocating plate carried by the yoke, means operating the reciprocating plate from one of the drive gears, means for controlling the movement of the reciprocating plate in relation to the yoke including a cylinder carried by the yoke and a piston carried by the plate, a port formed in the cylinder for permitting the flow of liquid from one end of the cylinder to the other around the piston to permit free movement of said piston, a rotary valve carried by the yoke for controlling the size of the port to limit the movement of said piston in the cylinder, and means for locking either one of the drive gears to the drive shaft and for operating said valve, and means for supplying liquid continuously to said cylinder to take up loss of liquid by leakage.

In testimony whereof I affix my signature.

JOHN L. LINGERFELDT.